(12) United States Patent
Talluri et al.

(10) Patent No.: US 7,454,477 B2
(45) Date of Patent: Nov. 18, 2008

(54) ZERO-COPY TRANSFER OF MEMORY BETWEEN ADDRESS SPACES

(75) Inventors: Madhusudhan Talluri, Bellevue, WA (US); Muthian Sivathanu, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 11/129,926

(22) Filed: May 16, 2005

(65) Prior Publication Data
US 2006/0259571 A1    Nov. 16, 2006

(51) Int. Cl.
*G06F 15/167* (2006.01)
*G06F 12/00* (2006.01)
*G06F 3/00* (2006.01)

(52) U.S. Cl. .................. 709/213; 719/312; 711/147
(58) Field of Classification Search .................. 709/213, 709/216; 711/147; 719/312
See application file for complete search history.

(56) References Cited

U.S. PATENT DOCUMENTS

| 5,715,447 | A | * | 2/1998 | Hayashi et al. | ................ | 707/8 |
|---|---|---|---|---|---|---|
| 5,729,710 | A | * | 3/1998 | Magee et al. | ................ | 711/203 |
| 5,737,605 | A | * | 4/1998 | Cunningham et al. | ........ | 719/312 |
| 6,073,157 | A | * | 6/2000 | Horiguchi et al. | ........... | 718/100 |
| 6,671,783 | B1 | * | 12/2003 | Sexton | ........................ | 711/147 |
| 6,789,156 | B1 | * | 9/2004 | Waldspurger | ................... | 711/6 |
| 6,859,812 | B1 | * | 2/2005 | Poynor | ........................ | 707/203 |
| 7,089,289 | B1 | * | 8/2006 | Blackmore et al. | .......... | 709/212 |

OTHER PUBLICATIONS

Sivathanu, M., "Bulk data transfer: design specification," *NextGen*, date not available, 19 pages.

* cited by examiner

*Primary Examiner*—Jeffrey Pwu
*Assistant Examiner*—Guang Li
(74) *Attorney, Agent, or Firm*—Woodcock Washburn LLP

(57) ABSTRACT

Methods for performing zero-copy memory transfers between processes or services using shared memory without the overhead of current schemes. An IPC move semantic may be used that allows a sender to combine passing a reference and releasing it within the same IPC call. An insulate method removes all references to the original object and creates a new object pointing to the original memory if a receiver requires exclusive access. Alternatively, if a receiving process or service seeks read-only access, the sender unmaps its access to the buffer before sending to the receiver. When the insulate operation is initiated, the kernel detects an object with multiple active references but no active mappings and provides a mapping to the memory without taking a copy or copy-on-write.

12 Claims, 2 Drawing Sheets

ZERO-COPY TRANSFER OF MEMORY BETWEEN ADDRESS SPACES

FIELD OF THE INVENTION

This invention relates in general to the field of computer software. More particularly, this invention relates to a system and method of providing communication between services running on a computer.

BACKGROUND OF THE INVENTION

A standard way to communicate between two processes 1 and 2 (running on the same machine or running on different machines) is to send a message, via, e.g., an interprocess communication (IPC) mechanism. Often, for example, it is desirable to enable process 1 to send a message to process 2 asking process 2 to execute code on behalf of process 1. Typically, process 1 must have knowledge of a port or contact point for process 2 in order to do this.

The procedure of transforming the function call into a message is called marshalling. Marshalling converts what the code in process 1 sees as a function call into 1 message to be sent to process 2. The message must contain the name of the function and a set of parameters, coded in a way that process 2 understands. Process 2 receives the message and has to transform the message into a call to process 2's internal function. The process of converting a message into a function call is called unmarshalling. The piece of code that performs marshalling in process 1 is called a proxy and typically resides in the client process. The corresponding piece of code on the server side that performs unmarshalling is called a stub. A reverse set of marshalling/unmarshalling occurs for the return parameters when process 2 returns results to process 1.

When a large amount of data needs to be transferred between processes and/or when a small portion of a larger piece of data needs to be accessed by another process, marshalling the data is very inefficient. Using shared memory is one way of avoiding the marshalling overhead, however it requires synchronization and trust between the processes A conventional way to accomplish the above when processes are cooperating processes is to set up a copy-on-write (COW). COW buffers are shared by multiple processes (or shared by a single process in multiple locations). When the buffer is modified, the writing process then receives its own copy of the object stored therein. However, while COW is efficient because copies are not made until a buffer is modified, the efficiencies can be further improved when the intent of the sending process is to pass ownership of the buffer to the receiver, or if the sender will not access the buffer anyway.

Thus, there is a need for system that improves over the limitations of the prior art. The present invention provides such a solution.

SUMMARY OF THE INVENTION

The present invention is directed to systems and methods for performing zero-copy memory transfers between processes or services using shared memory without the overhead of current schemes. An IPC move semantic may be used that allows a sender to combine passing a reference and releasing it within the same IPC call. If the receiver requires exclusive access, an insulate operation may be called that removes all references to the original object and creates a new object pointing to the original memory. Alternatively, if a receiving process or service seeks read-only access, the sender unmaps its access to the buffer before sending to the receiver. When the insulate operation is initiated, the kernel detects an object with multiple active references, but no active mappings and provides a mapping to the memory without taking a copy or copy-on-write.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
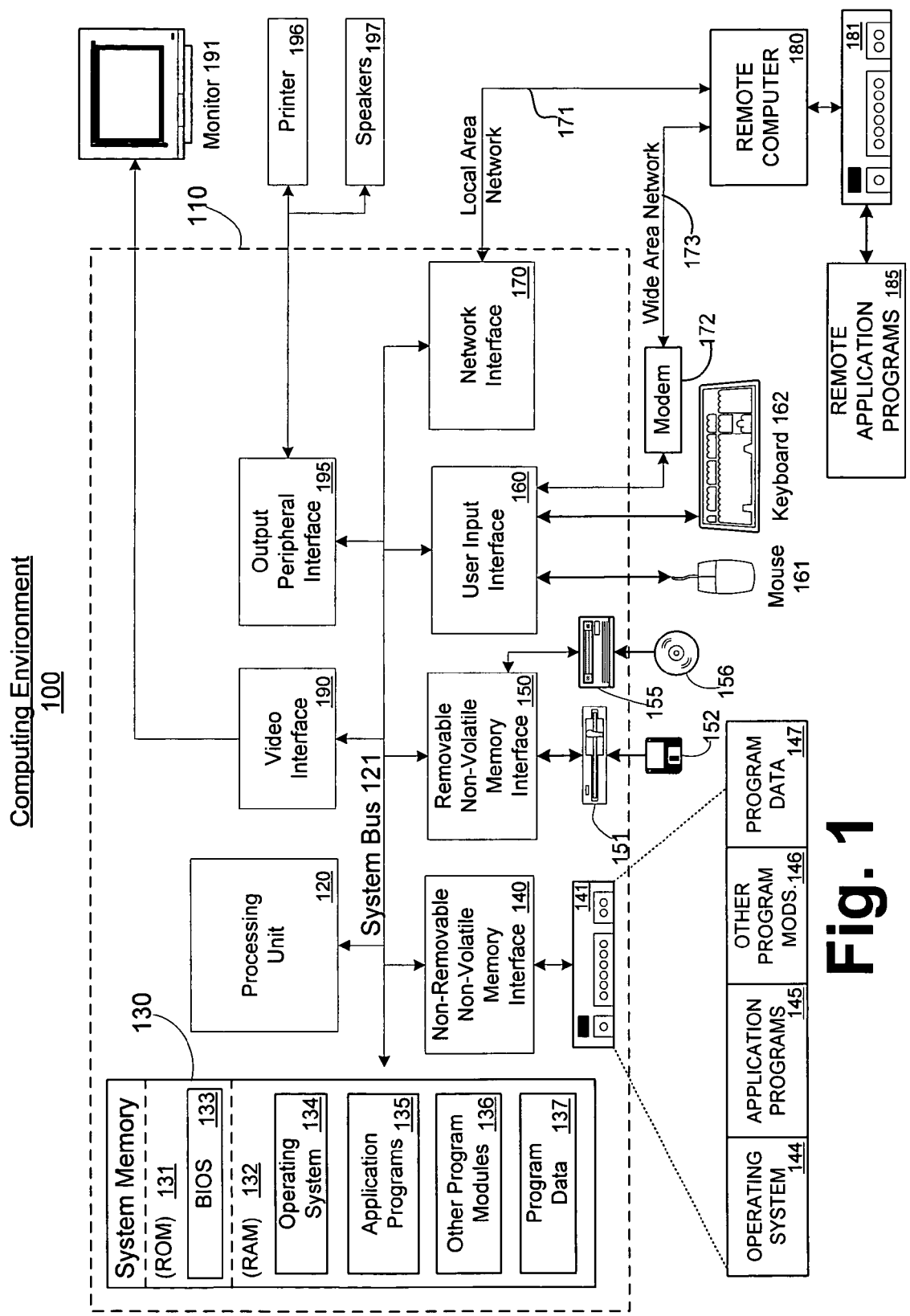
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of a Zero-Copy Transfer Between Address Spaces

In accordance with the present invention, a mechanism is provided to transfer data between services/processes using shared memory. A set of memory objects provide operations to enable services to control the sharing that exists when they transfer memory objects to other services. One functionality provided implemented by the present invention to accomplish this is an insulate operation, which logically creates a new copy of a memory object. This function is used by a service when it wants to be shielded from changes to the contents of the memory object made by other services, i.e., the service wants it own private copy of a memory object.

While the insulate operation returns a new copy of the memory object, an extra copy can be completely avoided if it can be ensured that no other service or process has outstanding handles to the original memory object. In this case, it is known that no process or service has a write mapping on the original memory object, and that no process or service can obtain a write mapping to that object in future. Thus, the new private copy will just point to the original memory and the copy will have been totally avoided. This aspect is a zero copy transfer in accordance with the present invention.

The zero copy transfer above caters to the situation where the sender is willing to "discard" its copy of the memory object, i.e., wishes to "move" it to the receiver, and the receiver performs a write mapping on the insulated object. In order to recognize the zero-copy transfer, the memory object determines the number of outstanding handles to the object. A problem with this is that it is difficult to obtain this information from a conventional IPC infrastructure. Thus, the present invention provides an interface that enforces the condition instead of verifying whether the condition holds.

The interface is a variant of the insulate method described above. The semantics of this method are as follows. It revokes all outstanding handles to the original memory object, including forcibly unmapping existing mappings to the original memory object. It then creates a new memory object which points to the same memory that the original object pointed to. Thus, this method achieves the zero copy insulate by ensuring that no service/process can change the original memory object in future.

Figure 2:
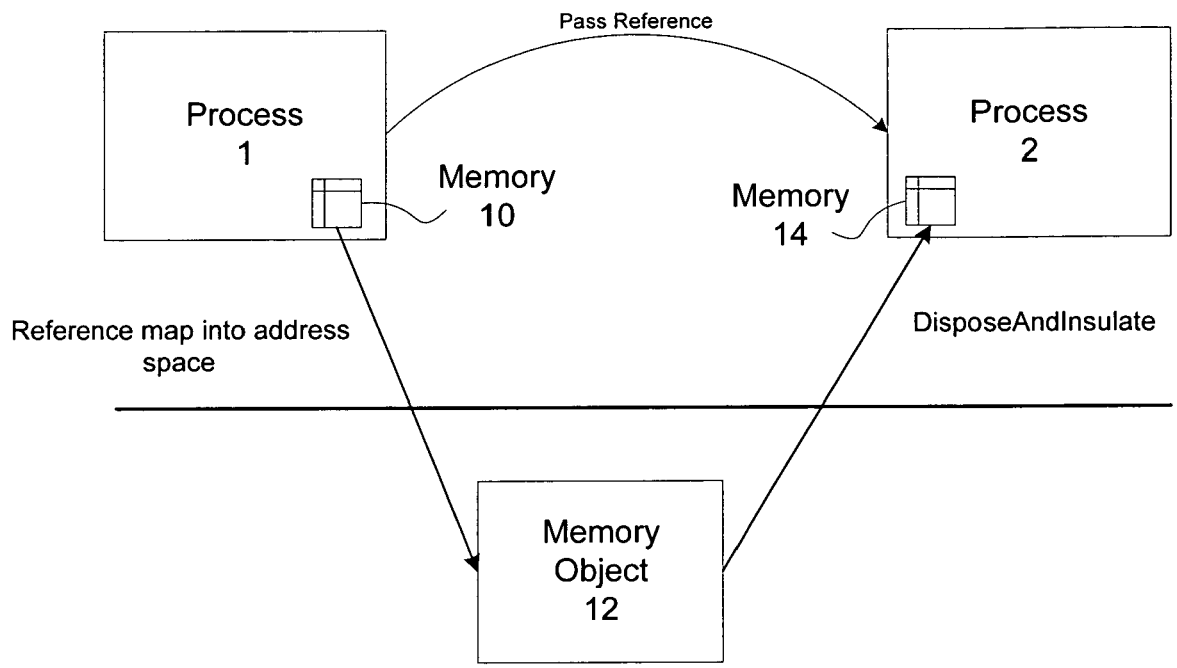
FIG. 2 illustrates communication of a message in accordance with the present invention.

With reference to FIG. 2, a very common programming pattern is for a sender to create a buffer, fill it up, and send it to the receiver as part of an IPC. The sender then releases the buffer. The receiver upon receiving the buffer performs an insulate (as it does not trust the sender). At this point, even though the sender is not actively trying to access the buffer, the kernel assumes that the sender still has access to the buffer and takes a copy for the receiver or sets up a copy-on-write. The sender has no other way to program to avoid the copy/insulate overhead as it cannot release the buffer before passing it.

The Move semantic in the IPC addresses this as it provides a way for the sender to combine the passing a reference and releasing it within the same IPC call. However, the move semantic by itself is not sufficient. Conventionally, when the receiver calls Insulate, the implementer of the memory object has to know that there are no other active references to the memory object in order to optimize the insulate and do zero-copy. The usual reference counting framework informs the object when there are no active references, but in this case there is one active reference and that notification does not occur. While the framework can provide a query function to check if the reference count is one, the query is inherently unreliable and the reference count could change soon after the query returned. The present invention provides a reliable way of removing the references to the original object and creating a new object pointing to the original memory.

The novel combination of the two methods in the present invention, as noted above, allows the sender to release the reference as it passes it and for the receiver to get an insulated view of the object that the system guarantees has no other references to it.

In another common programming pattern, the copy is delayed when other processes have references to the memory but no active mappings. In this case, the receiver only needs read access. The copy is made only if the other processes try to establish a write mapping. A pair of processes may share a buffer but alternate between the sender writing to the buffer and the receiver reading from it, e.g., a producer/consumer relation. In this case the sender should not release the buffer each time, as it will be reused multiple times. Because the sender typically has write access and a receiver (who does not trust the sender) performs an insulate call, the kernel would need to either copy or set up a copy on write mapping each time.

The sender will unmap its access to the buffer before sending to the receiver and remap on next iteration. This is faster than a copy-on-write setup/teardown in most systems. When the receiver calls insulate the kernel will find an object with multiple active references but no active mappings. In this case it can remember this fact and provide a mapping to the memory without taking a copy or copy-on-write. In the normal case when the sender does not try to access this memory, the receiver finishes its access and frees the mapping and no copy is ever done. If the sender misbehaves and tries to write to the memory while the receiver is looking at it, the act of mapping can be used to take one of several actions: block the sender, give the sender a copy of the pages, or give the sender a copy-on-write access to the pages. In all cases, the overhead is taken only in the case the sender does not follow the protocol.

In both patterns above, the receiver does not trust the sender completely and is making a kernel call to insulate. The copy is avoided when all parties are well-behaved and we get a copy/slow performance when they are not. The receiver always sees a private copy. The scheme also works with a chain of communicating processes where the process that needs a private copy can be a couple of levels deep in the chain.

A few considerations that are accounted for are as follows. If the sender sends a reference by does not use the move semantic, the receiver may remove access to the memory object. Other processes may have access to the memory object, and they too would lose access. Another consideration is if the process does not want to use the methods above where the receiver desires read access (or read/write). Here the sender does not unmap. On insulate, the receiver will receive a pointer to a copy which will be a different memory object. This is similar to COW and avoids problems of the sender still having access. If the sender does not unmap, then on an insulate by the receiver, the receiver is granted access to a shadow and a copy is made only if the sender tries to access the memory object. Yet another consideration is if the sender unmaps, but later tries to map the memory object. Here a copy is made if the sender tries to write to the memory object, but not if the sender only reads the object. Thus, copies are made only when the object is written to in the above situations.

The implementation details of the present invention will now be described. The bulk data transfer framework is preferably implemented in the form of in-kernel services: a memory object service and an address space service. These may be part of the same service or be two separate collocated services. This means that calls to the methods on the memory object or address space are normal IPCs into these services.

Figure 3:
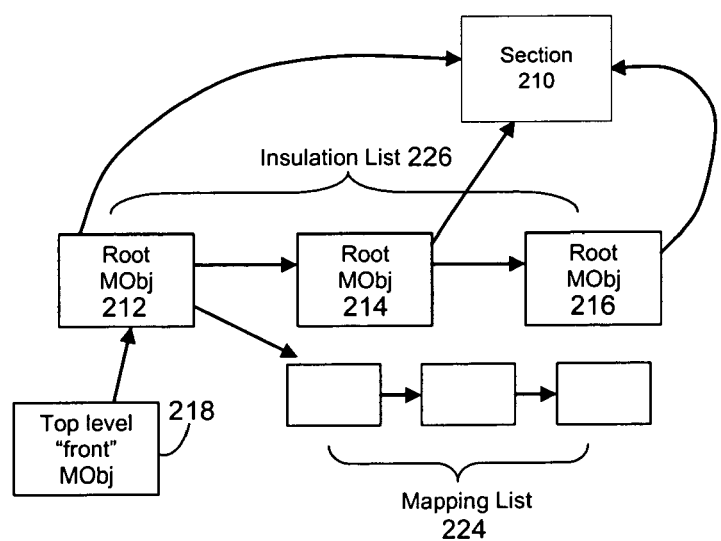
FIG. 3 illustrates exemplary data structures used by the present invention.

The basic data structures will now be described with reference to FIG. 3. The present invention utilizes two basic objects: the memory object and the address space object. There are cross-references between the memory object and the address space object because of the co-operation between them in maps and unmaps. The validity of these references is ensured by using the same unreferenced mechanism assuming that both these objects are serviced by different, collocated services. Each reference from the address space object to a memory object increments the reference count on the memory object, and would prevent the memory object from being unreferenced. Similarly, as long as a memory object maintains a reference to an address space, the address space object will not be unreferenced.

This inter-linkage has the following considerations with regard to fbuf-style reuse of memory objects. For a memory object to be added to a free list (described below), it is unreferenced. However, a memory object will not be unreferenced as long as a mapping in the address space points to the memory object. Therefore, in order to allow memory object to be unreferenced with active mappings, a simple procedure is used: pass out only a "front" object to all services, where the real "root" object (Root Mobj 212-216) is visible only to the address space service. Since the mappings on the address space would only point to the root object, it would not prevent a top-level "front" object 218 from getting an unref. Also, when the top level front object receives an unref, no service other than the address space has an active reference to it. Thus, the real "root" object can be added to the free list. When the "root" object is reused, a new "front" object 218 is manufactured and is sent out.

The top level memory object 218 will now be described. As described above, a memory object is the abstraction for a piece of memory. Internally, it uses WINDOWS memory sections 210 to create and manage the memory. Each top-level memory object 218 points to a section that represents that memory. To avoid opening the section object each time a mapping is required, the memory object 218 directly stores a handle to the section which can be directly specified in a map request. This handle is a kernel mode handle and hence cannot be directly accessed from the user level process.

The top level object 218 also contains the offset within the section that represents this memory object and the size of the object. The offset field for top level objects is currently zero for a newly created object, because each memory object is mapped to a unique section. Since the cost of creating new sections each time may be significant, a model may be used where one (or a few) large section(s) is used and then allocation work is performed within that section, to manage free space within the memory object framework. In that case, the offset could be non-zero even for newly created memory objects.

A structure that the top level memory object 218 maintains is a list of mappings 224 on the memory object. This list 224 may be a linear list since a single memory object will likely not have too many mappings. Each entry in the mapping list 224 may contain the following fields. First, it may contain a reference to the address space object that has the mapping and the virtual address within that address space where the mapping is made. Second, it may contain the access mode of the mapping and the offset and length within the memory object that is mapped. Finally, it may contain a reference to the actual memory object in whose context the mapping was done. This is used in the case of mappings of restricted objects, because the top level object alone maintains the mapping list. Other fields may be used as necessary.

The top level memory object 218 also points to an insulation list 226. This list 226 contains the list of logically different memory objects that share the same memory as a result of delayed copy insulation (i.e., none of the memory objects are currently write-mapped). A new memory object created will have a NULL insulation list, but as insulates occur on the same object, this list 226 can grow. This list 226 may be protected by a global set of locks, and the appropriate lock is chosen by hashing the address of the insulation list. All memory objects on the same insulation list share the same section. Only on a conflicting mapping, the conflicting mobj breaks away from the list and gets its new section.

The address space object tracks the address space of a given process as it pertains to the memory objects that are mapped into it. The address space, thus tracks a hash table of the list of memory object mappings that have been made on the address space. An ActiveMappings hash table may contain this information. This table is hashed on the start virtual address of the mapping. Preferably, this is an AVL tree, which can be searched for the "closest matching address" as opposed to the "exact address" in order to facilitate partial unmaps.

Each entry in the mappings hash table contains the starting virtual address of the mapping and the length of the mapping. It also has a reference to the actual (possibly restricted) memory object that is mapped, and to the "root" memory object of the restricted tree to which the actual memory object belongs. While the actual memory object is tracked for purposes of notifying that object of a subsequent unmap of that mapping, the root object is tracked for purposes of fbuf like delayed unmaps. Because an fbuf memory object is added to the free list only after all its children are unreferenced, the address space cannot refer to the actual mobj in a "dying" mapping, i.e., a mapping which is freed, but has been delayed for possible reuse. Thus, such dying mappings point to the actual "root" object, which will remain valid as long as this pointer exists.

The address space object also holds a similar hash table of dying mappings. When an unmap is delayed, the mapping entry is moved from the active mappings to the delayed mappings list, after nullifying the actual memory object and making it point to the "root" memory object. An address space object also has a pointer to the IPC_PROCESS structure of the process corresponding to this address space. This is required for initialization and cleanup purposes as will be described later. Finally, each address space object has a Mutex to serialize concurrent map/unmap operations.

The address space object is pointed to by the IPC_PROCESS structure of each process, and gets allocated when the process tries to get a handle to its address space object (via, e.g., a special function). A process holding a reference to the address space increases the ref count of the address space object; thus the address space object for a process, once created, is not unreferenced until the process dies.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of transferring data between services using shared memory, comprising:
   controlling sharing of a first memory object;
   determining if outstanding handles to said first memory object exist;
   if said outstanding handles do not exist, transferring a pointer to said first memory object from a first service to a second service to avoid making a copy of said first memory object;
   if an outstanding handle to said first memory object does exist, revoking the outstanding handle to said first memory object, including forcibly un-mapping any existing mapping to the first memory object, and creating a new memory object that points to a same memory that said first memory object pointed to, wherein said first memory object cannot be changed;
   delaying making a copy of said first memory object while said outstanding handles exist but there are no active mappings; and
   alternating read/write mappings to said memory object between said first service and second service such that neither said first service, nor said second service have a write mapping to said memory object at the same time.

2. The method of claim 1, further comprising providing a first operation, which logically creates a new copy of said first memory object.

3. The method of claim 1, further comprising: releasing a reference to said first memory object as said first service passes said pointer to said second service; and ensuring that there are no other references to said first memory object.

4. The method of claim 1, further comprising making a copy when said second service establishes a write mapping to said first memory object and said first service attempts to establish a write mapping to said first memory object.

5. A computer storage medium having stored thereon computer executable instructions for transferring data between services using shared memory, said instructions for performing the method of:
   controlling sharing of a first memory object;
   determining if outstanding handles to said first memory object exist;
   if said outstanding handles do not exist, transferring a pointer to said first memory object from a first service to a second service to avoid making a copy of said first memory object;
   if an outstanding handle to said first memory object does exist, revoking the outstanding handle to the first memory object, including forcibly un-mapping any existing mapping to the first memory object, and creating a new memory object that points to a same memory that said first memory object pointed to, wherein said first memory object cannot be changed;
   delaying making a copy of said first memory object while said outstanding handles exist but there are no active mappings; and
   alternating read/write mappings to said first memory object between said first service and second service such that neither said first service, nor said second service have a write mapping to said first memory object at the same time.

6. The computer storage medium of claim 5, further comprising instructions for providing a first operation, which logically creates a new copy of said first memory object.

7. The computer storage medium of claim 5, further comprising instructions for: releasing a reference to said first memory object as said first service passes said pointer to said second service; and ensuring that there are no other references to said first memory object.

8. The computer storage medium of claim 5, further comprising instructions for making a copy when said second service establishes a write mapping to said first memory object and said first service attempts to establish a write mapping to said first memory object.

9. A method of transferring data between a first service and a second service, comprising:
   creating a first memory object pointing to a buffer for use by said first service;
   writing to said buffer by said first service by way of the first memory object;
   releasing said buffer by said first service after said writing is performed;
   removing references to said buffer after the writing is performed and said buffer is released, by removing the first memory object;
   creating a second memory object pointing to said buffer for use by said second service;
   reading from said buffer by said second service by way of the second memory object;
   releasing said buffer by said second service after said reading is performed;
   removing references to said buffer after said reading is performed and said buffer is released, by removing the second memory object;
   wherein the method is performed without creating a copy of said buffer; and
   alternating read/write mappings to said buffer such that neither said first service, nor said second service have a write mapping to said buffer at the same time, wherein if one or more handles for said first memory object is outstanding, delaying making a copy of said first memory object while outstanding handles to said first memory object exist but there are no active mappings.

10. The method of claim 9, further comprising sharing said buffer between said first service and said second service.

11. The method of claim 10, further comprising making a copy only when one of the services attempts to write to said buffer while the other service has a write mapping to said buffer.

12. The method of claim 9 further comprising making a copy when said second service establishes a write mapping to said second memory object and said first service attempts to establish a write mapping to said first memory object.

* * * * *

UNITED STATES PATENT AND TRADEMARK OFFICE
CERTIFICATE OF CORRECTION

| | |
|---|---|
| PATENT NO. | : 7,454,477 B2 |
| APPLICATION NO. | : 11/129926 |
| DATED | : November 18, 2008 |
| INVENTOR(S) | : Madhusudhan Talluri et al. |

It is certified that error appears in the above-identified patent and that said Letters Patent is hereby corrected as shown below:

In column 10, line 59, in Claim 12, delete "claim 9" and insert -- claim 9, --, therefor.

Signed and Sealed this
Twenty-sixth Day of April, 2011

David J. Kappos
*Director of the United States Patent and Trademark Office*